United States Patent
Favorito

(10) Patent No.: US 6,668,756 B1
(45) Date of Patent: Dec. 30, 2003

(54) ARTIFICIAL FISH HABITAT FOR A FISHPOND

(76) Inventor: Thomas Favorito, 437 West Ave., Northvale, NJ (US) 07647

( * ) Notice: Subject to any disclaimer, the term of this patent is extended or adjusted under 35 U.S.C. 154(b) by 0 days.

(21) Appl. No.: 10/410,054

(22) Filed: Apr. 9, 2003

(51) Int. Cl.[7] .......................... A01K 61/00; A01K 63/00
(52) U.S. Cl. ........................................ 119/221; 119/245
(58) Field of Search ................................ 119/215, 219, 119/221, 226, 227, 245; 47/59 R, 62 C

(56) References Cited

U.S. PATENT DOCUMENTS

| | | | | |
|---|---|---|---|---|
| 3,824,956 A | * | 7/1974 | Presley ........................ | 119/221 |
| 5,201,136 A | * | 4/1993 | LaMorte et al. ............ | 119/221 |
| 5,215,406 A | * | 6/1993 | Hudson ........................ | 119/221 |
| 5,722,347 A | * | 3/1998 | Tominaga et al. .......... | 119/245 |
| 5,803,660 A | * | 9/1998 | Warren et al. .............. | 119/221 |
| 5,957,084 A | * | 9/1999 | Knepp ........................ | 119/245 |
| 6,112,459 A | * | 9/2000 | Hirose ........................ | 47/59 R |

* cited by examiner

Primary Examiner—Charles T. Jordan
Assistant Examiner—Elizabeth A. Shaw
(74) Attorney, Agent, or Firm—Goldstein & Lavas, P.C.

(57) ABSTRACT

An artificial fish habitat for use with a recreational fishpond. The fish habitat is provided as at least one section, having a front panel, a rear panel, a top panel, and a substantially rectangular holder basket which is fitted into an opening within the top panel. For larger ponds, several of the interlocking sections are fitted into one another, thereby providing a fish habitat of larger overall dimensions. A plurality of slotted openings within the panels provide ready egress and ingress for fish. The holder basket is adorned with artificial grasses, thereby providing shelter for juvenile fish. The artificial fish habitat provides shelter to the fish from direct sunlight and also provides a sanctuary from natural predators. The fish habitat includes an aerator hose, which may be selectively attached to an external aerator pump to increase the concentration of dissolved oxygen within the water of the fishpond.

8 Claims, 5 Drawing Sheets

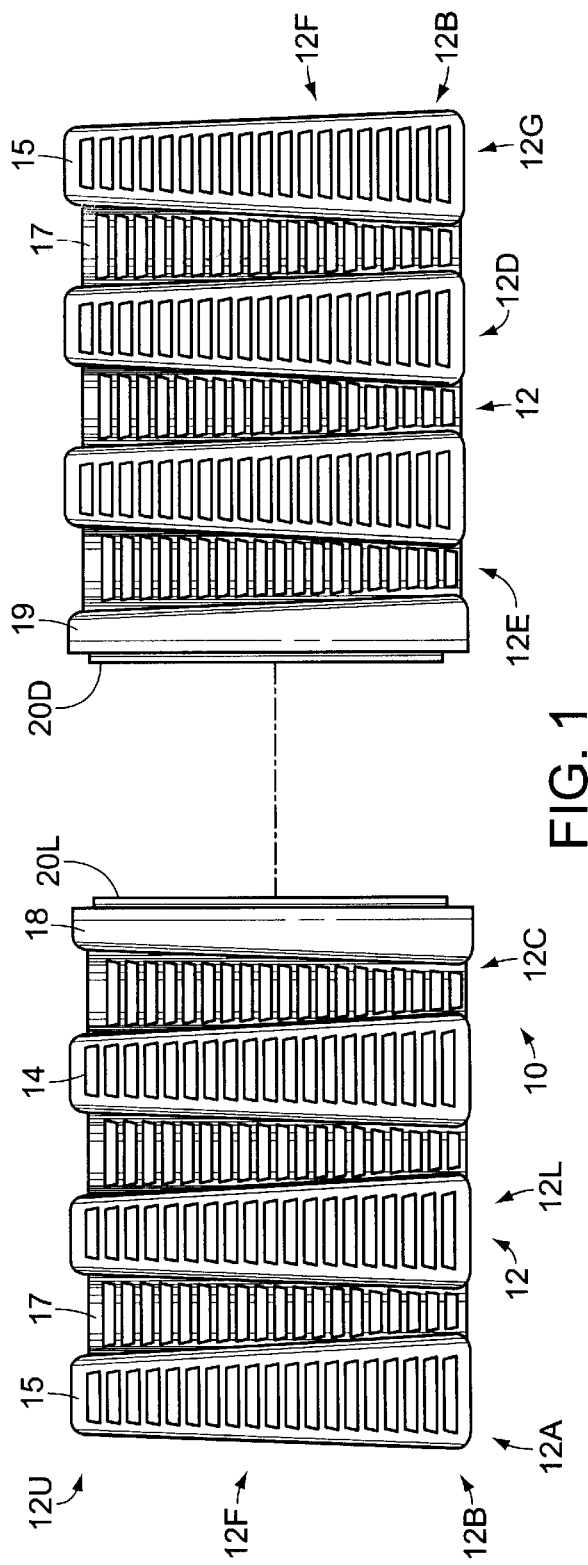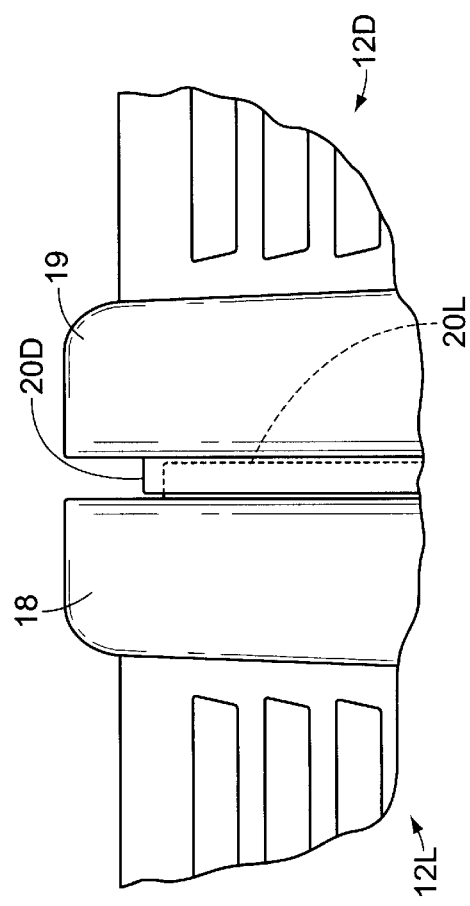

ARTIFICIAL FISH HABITAT FOR A FISHPOND

BACKGROUND OF THE INVENTION

1. Field of the Invention

The invention generally relates to an artificial fish habitat which is placed within a fishpond in order to provide a more optimal environment for fish, and in particular relates to an artificial fish habitat having an enclosure having a plurality of slotted openings which are used as entry/exit points by the fish, having artificial grass on its top surface for providing shelter for juvenile fish, and having a hose which is optionally connected to an externally located aerator pump for aeration of water within the fishpond.

2. Description of the Related Art

A large number of people maintain fishponds for recreational purposes. In addition to providing a suitable environment for raising fish, it is additionally a purpose of most owners of "recreational" fishponds to have a fishpond which is visually attractive and clean.

A variety of artificial fish habitats are available for placement within bodies of water. U.S. Pat. No. 5,785,002 to Cazin appears to show an artificial fish habitat comprised of a frame assembly having an array of fibers for collection of fish eggs. However, Cazin is specifically designed as a breeding structure and is therefore of limited use to the owner of a "recreational" pond.

U.S. Pat. No. 5,158,037 to Engelbart appears to show an artificial fish habitat which aerates a pond, thereby providing an improved environment for raising fish. However, Engelbart is primarily addressed to a device for optimally raising fish in an intensive fish-raising facility and is not well suited for the typical owner of a "recreational" pond.

U.S. Pat. No. 5,669,330 to O'Hare appears to show an artificial fish habitat for raising juvenile fish, comprised of a structure with simulative indigenous plants for providing shelter for fish. However, O'Hare is primarily meant to be used as a substitute for indigenous plants which have been diminished from a natural estuary system, and for reduction of wave energy impacting a shoreline. Accordingly, O'Hare is not suitable for use in a "recreational" pond.

U.S. Pat. No. 4,993,362 to Jimbo appears to show an artificial fish habitat comprised of a frame having a plurality of shelves. However, Jimbo contemplates an artificial fish habitat which is installed upon a sea floor, and is not appropriate for use in a "recreational" fishpond.

None of these devices appear to disclose a similar construction for an artificial fish habitat for a fishpond as shown. While the aforementioned devices may be suitable for the particular purpose employed, or for general use, they would not be as suitable for the purposes of the present invention as disclosed hereafter.

SUMMARY OF THE INVENTION

It is an object of the invention to produce an artificial fish habitat which provides a safe haven for fish within a fishpond. Accordingly, the artificial fish habitat shelters the fish from natural predators, and also provides shade from the direct rays of the sun.

It is another object of the invention to produce an artificial fish habitat which provides protection for juvenile fish. Accordingly, the artificial fish habitat is adorned with artificial grasses which provide protection for juvenile fish from adult fish.

It is yet another object of the invention to produce an artificial fish habitat which may be used for increasing the level of dissolved oxygen in the water. Accordingly, the artificial fish habitat is equipped with an aerator hose which may be optionally connected to an externally located aerator pump for aeration of water within the fishpond, thereby increasing the level of dissolved oxygen in the water.

It is an additional object of the invention to produce an artificial fish habitat which enhances the appearance of the fishpond. Accordingly, the artificial fish habitat may be adorned with artificial grasses and other plants, as well as other ornaments, thereby enhancing the appearance of the fishpond.

It is a further object of the invention to produce an artificial fish habitat which is not unduly expensive. Accordingly, the artificial fish habitat is constructed from inexpensive, readily available materials, and its cost is not prohibitive.

The invention is an artificial fish habitat for use with a recreational fishpond. The fish habitat is provided as at least one section, having a front panel, a rear panel, a top panel, and a substantially rectangular holder basket which is fitted into an opening within the top panel. For larger ponds, several of the interlocking sections are fitted into one another, thereby providing a fish habitat of larger overall dimensions. A plurality of slotted openings within the panels provide ready egress and ingress for fish. The holder basket is adorned with artificial grasses, thereby providing shelter for juvenile fish. The artificial fish habitat provides shelter to the fish from direct sunlight and also provides a sanctuary from natural predators. The fish habitat includes an aerator hose, which may be selectively attached to an external aerator pump to increase the concentration of dissolved oxygen within the water of the fishpond.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is an exploded view of the artificial fish habitat, wherein two interlocking sections are being fitted into one another.

FIG. 2 is an enlarged front elevational view, detailing an area of attachment of the two interlocking sections.

DETAILED DESCRIPTION OF THE PREFERRED EMBODIMENTS

Figure 3:
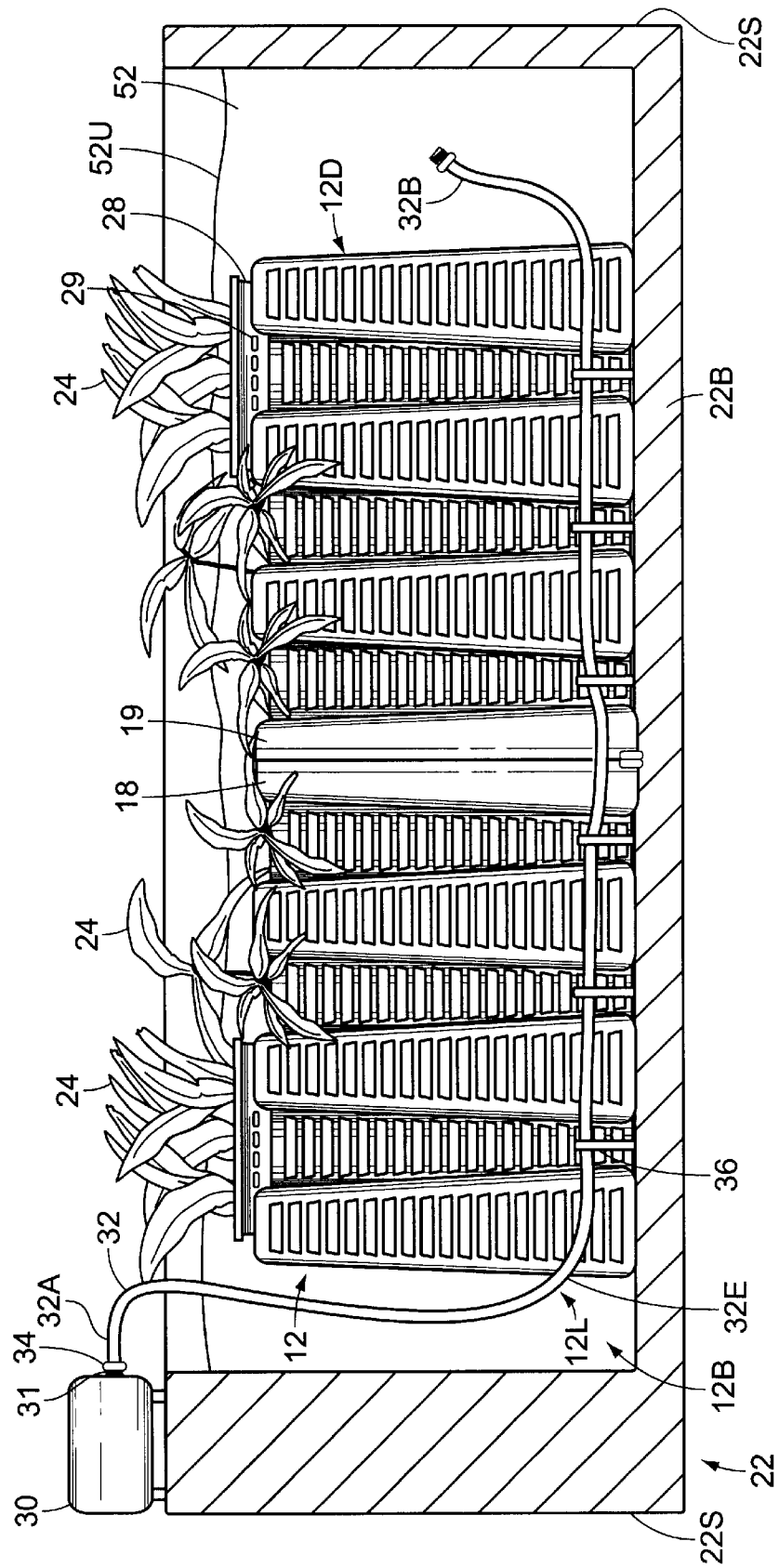
FIG. 3 is a front elevational view of the artificial fish habitat being used in conjunction with a fishpond.

FIG. 1 illustrates a front elevational view of the artificial fish habitat 10, comprised of at least one interlocking section 12. Each section 12 has a front panel 12F, an opposing rear panel, and a top panel which extends between and connects the front panel 12F and the rear panel. Although the front panel 12F of each section 12 is visible, the rear panel and the top panel are not visible in FIG. 1 and are best seen with reference to FIG. 6 as will be described below. The front panels 12F and the rear panels each have alternating protruding columns 15 and recessed columns 17 for increasing the surface area which is available to the fish for entry within the artificial fish habitat 10 as will be described hereinafter.

It should be noted that the habitat is generally provided as a single, long piece (section) which may be cut in the transverse direction to provide several habitats. Alternatively, as illustrated, two interlocking sections, namely a left section 12L and a right section 12D are provided, which need not be identical. Rather, although the left section 12L has a first side 12A and a second side 12C, and the right section 12D also has a first side 12E and a second side 12G, the first side 12A of the left section 12L is not identical to the first side 12E of the right section 12D. The second sides 12C and 12G of the sections 12L and 12D are also dissimilar. In particular, the second side 12C of the left section 12L has a connecting portion 18 having an interlocking fitting 20L, and the first side 12E of the right section 12D has a connecting portion 19 having an interlocking fitting 20D. The left section 12L is selectively attachable to the right section 12D by mating the interlocking fitting 20L located on the left section 12L with the interlocking fitting 20D located on the right section 12D. FIG. 2 illustrates a front elevational view of the two connecting portions, 18 and 19, of the two interlocking sections 12L and 12D respectively, after attaching the sections 12 to one another by extending the interlocking fitting 20L within the interlocking fitting 20D.

A variety of methods are available for attachment of the sections 12 of the artificial fish habitat 10 to one another. For example, the interlocking fitting 20L may have an attachment bracket and the interlocking fitting 20D may have an attachment hook, thereby allowing the left section 12L to be selectively attached to the right section 12D by mating the attachment bracket on the left section 12L with the attachment hook on the right section 12D. Alternate attachment methods are also possible.

Figure 6:
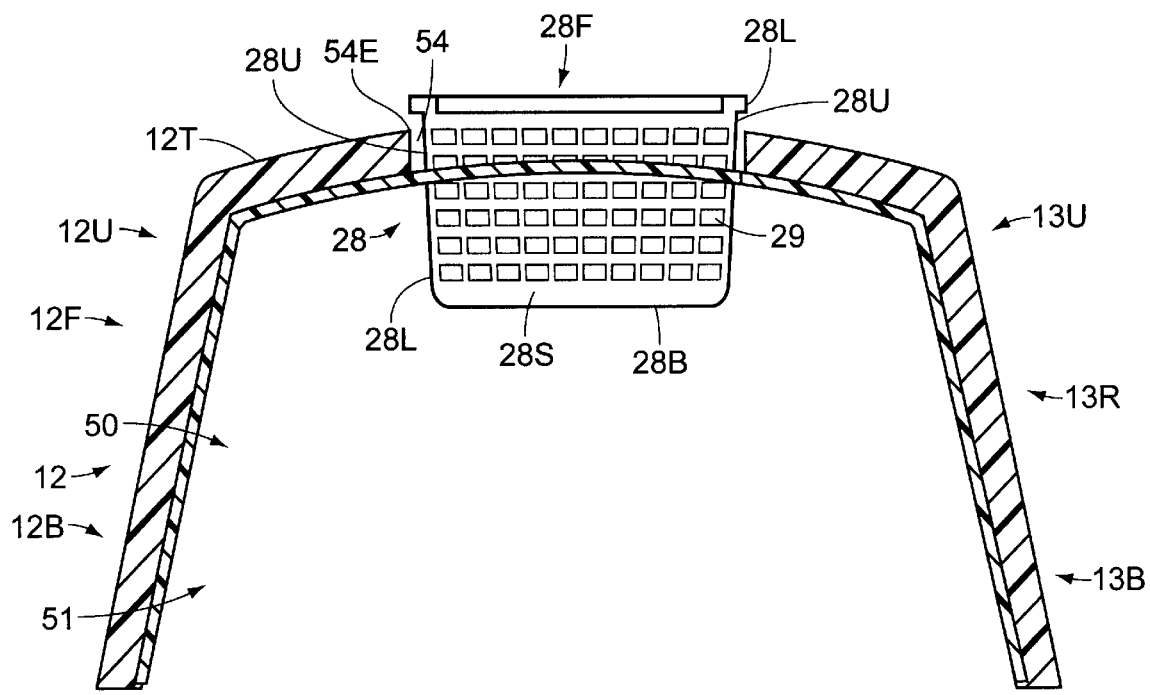
FIG. 6 is a cross-sectional view taken along line 6—6 of FIG. 5, illustrating the rectangular holder basket extending through the top panel of the artificial fish habitat, and showing the voluminous open space contained within the artificial fish habitat.

FIG. 6 illustrates a cross-sectional view through one of the sections 12, wherein both the front panel 12F and the rear panel 13R are visible. The front panel 12F has an upper portion 12U and a lower portion 12B. Analogously, the rear panel 13R also has an upper portion 13U and a lower portion 13B. Each section 12 of the fish habitat 10 has a top panel 12T extending fully from the upper portion 12U of the front panel 12F to the upper portion 13U of the rear panel 13R, thereby connecting the front panel 12F to the rear panel 13R, and forming an enclosed tunnel 50 within each section 12. The tunnel 50 provides shelter to the fish from direct sunlight and from natural predators such as birds of prey which may otherwise feed on the fish within the fishpond 22. The tunnel 50 also generally provides a more varied environment for the fish within the fishpond, which is important for the well being of the fish. FIG. 1 illustrates that each of the front panels 12F has a plurality of substantially rectangular slotted openings 14 extending fully through the front panels 12F, which allow the fish to enter the tunnel 50 within each section 12. The rear panel 13R also has slotted openings 14 which serve the same purpose. FIG. 6 indicates that the fish may also readily enter the tunnel 50 by swimming into the tunnel 50 through the archway 51 defined by the front panel 12F, the top panel 12T, and the rear panel 13R.

The front panel, the rear panel, and the top panel may be constructed from a single, continuous piece of material, as illustrated in FIG. 6. Alternately, these panels may be separately provided, and attached to one another by the user, thereby allowing a user to assemble each section from its component panels.

A user determines the overall size of the artificial fish habitat 10 by interconnecting a particular number of interlocking sections 12. In FIG. 1, two interlocking sections 12 are being fitted into one another. However, for a smaller pond, a single section 12 may be more appropriate. For a larger pond, more than two sections may be attached to one another. Of course, attachment of more than two sections would require minor variations in the relative orientation of the connecting portions and the interlocking fittings of each section as described above.

FIG. 3 illustrates a front elevational view of the artificial fish habitat 10 being used in conjunction with a fishpond 22 having two side walls 22S and a bottom surface 22B. The lower portion 12B of each section 12 is resting upon the bottom surface 22B of the fishpond 22. The fishpond 22 is substantially filled with water 52, having an upper surface 52U. The artificial fish habitat 10 is substantially submerged beneath the upper surface 52U of the water 52. Here, the left section 12L has been attached to the right section 12D.

Returning momentarily to FIG. 6, the top panel 12T of each section 12 has a holder basket opening 54 extending fully therethrough. Each section 12 is provided with a substantially rectangular holder basket 28 which is selectively positioned within said opening 54. The position of the basket 28 within the opening 54 is shown in the cross-sectional view illustrated in FIG. 6. Returning again to FIG. 3, the basket 28 and other surfaces upon the top panel 12T are adorned with artificial grass 24 for enhancing the aesthetic appeal of the artificial fish habitat 10, and also for providing shelter for juvenile fish from the adult fish. Accordingly, portions of said grasses 24 are submerged below the upper surface 52U of the water 52.

The fish habitat 10 is equipped with an aerator hose 32 having a first end 32A and a second end 32B. The fish habitat also has clamps 36 for anchoring said hose 32 in proximity to the lower portions 12B of both the left section 12L and the right section 12D. An aerator pump 30 having an air outlet valve 31, is positioned upon one of the side walls 22S of the fishpond 22. The aerator pump 30 may be optionally included with the artificial fish habitat 10. The first end 32A of the hose 32 is selectively attachable to the air outlet valve 31. The hose 32 has an external surface 32E and an internal bore, and a plurality of openings extending fully from the external surface 32E to the internal bore. Activation of the pump 30 causes pressurized air to be released from the air outlet valve 31 and to flow into the hose 32. The pressurized air exits the hose 32 through the plurality of said openings within the hose 32. The second end of the hose 32 may be optionally provided with a one-way safety valve for allowing pressurized air to escape in the event that the openings within the hose 32 become clogged with debris.

Figure 4:
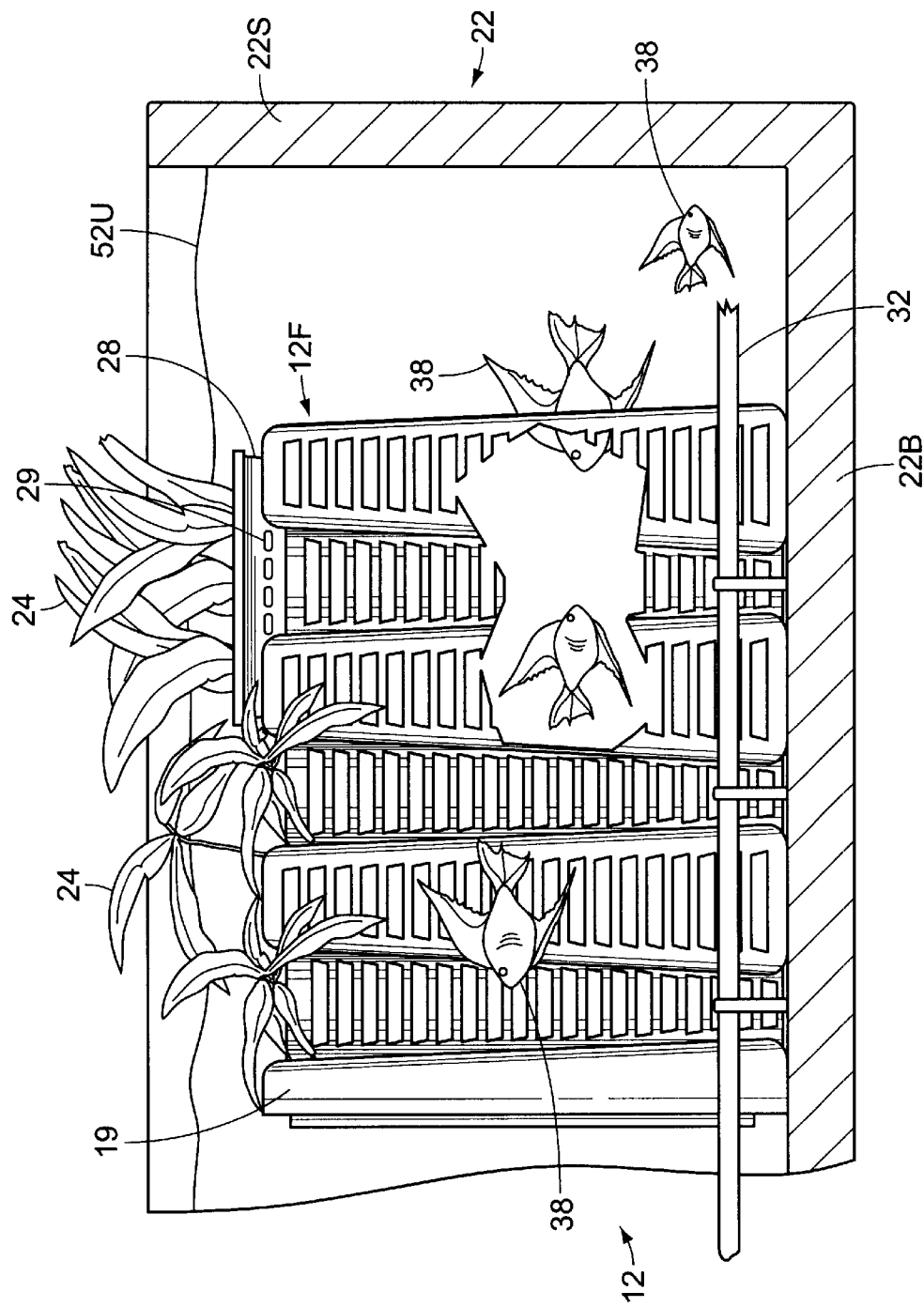
FIG. 4 is a front elevational view of an interlocking section of the artificial fish habitat after submersion within a fishpond, with portions of the front panel broken away in order to see the fish which have entered the artificial fish habitat.

FIG. 4 illustrates a view of one of the sections 12 of the artificial fish habitat 10 after submersion within a fishpond 22 having a plurality of fish 38, wherein portions of the front panel 12F are broken away in order to see the fish 38 which have entered the artificial fish habitat 10.

Figure 5:
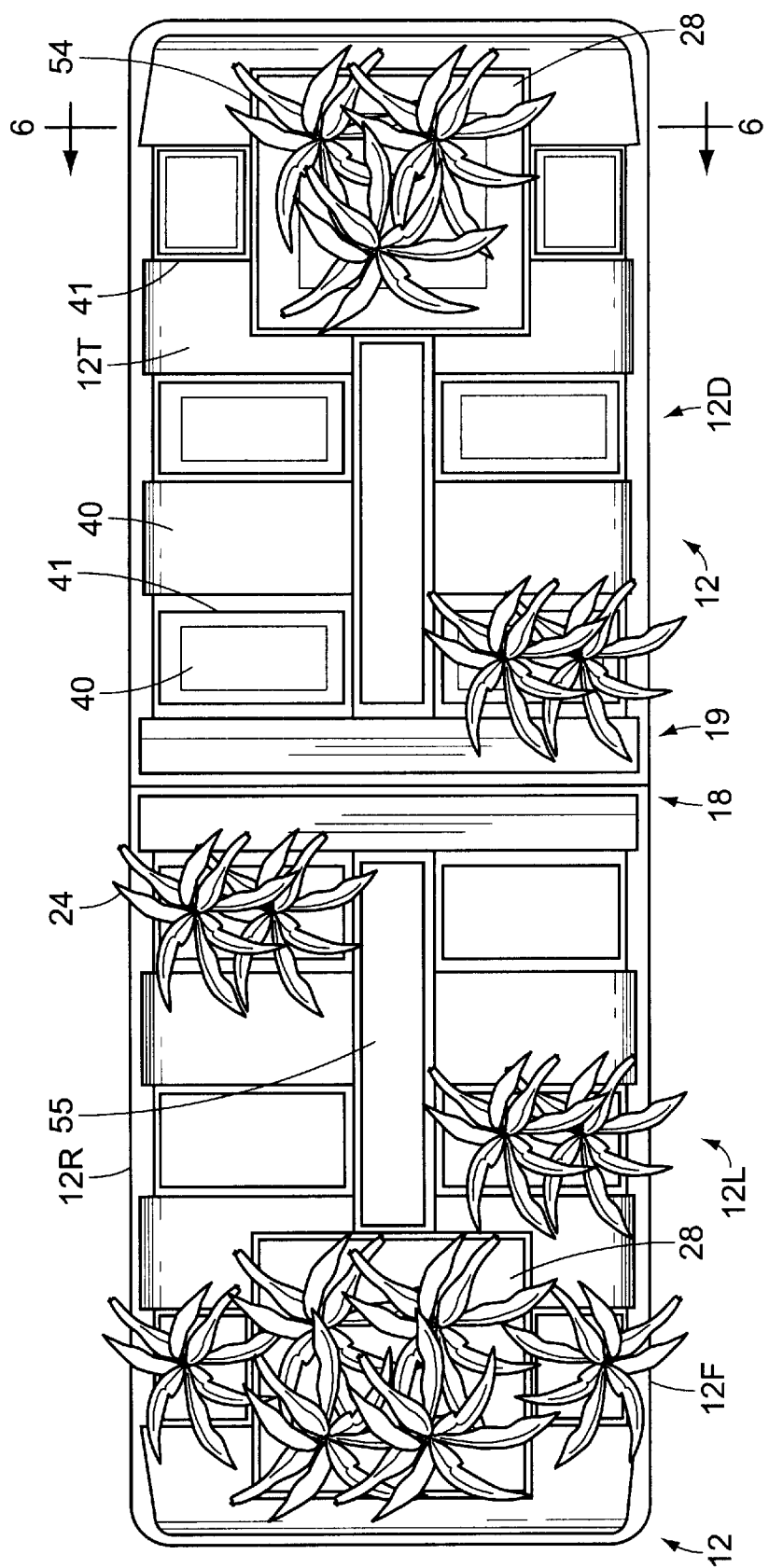
FIG. 5 is a top plan view of the artificial fish habitat.

FIG. 5 illustrates a top plan view of the artificial fish habitat 10, wherein the left section 12L is positioned for insertion within the right section 12D. The top panels 12T of each of the sections 12 have a plurality of substantially rectangular segments 40 which are formed by dividers 41 which extend vertically upward from the top panel 12T. A number of the segments 40 upon the top panel 12T of the left section 12L are adorned with artificial grasses 24. The top panel 12T of the right section 12D is unadorned in order that the rectangular segments 40 may be easily seen. The top panel 12T is additionally equipped with a ballast compartment 55, also defined by dividers 41, which may be filled with stones or gravel, in order to firmly anchor the artificial fish habitat 10 to the bottom surface 22B of the fishpond 22.

FIG. 6 illustrates a cross-sectional view taken along line 6—6 of FIG. 5. The top panel 12T has a rectangular opening 54 which is defined by edges 54E, wherein said opening 54 is sized to accommodate the holder basket 28. The holder basket 28 has a bottom surface 28B, four side surfaces 28S, an upper portion 28U, a lower portion 28L, and a substantially rectangular opening 28F located in proximity to the upper portion 28U. The holder basket 28 also has a lip 28L which extends laterally outward from each of the side surfaces 28S at the upper portion 28U of the holder basket 28. The lip 28L engages the edges 54E of the opening 58 when the holder 28 is placed within the opening 54, so that the holder basket 28 is firmly supported within the opening 54. The side surfaces 28S and the bottom surface 28B have a plurality of substantially rectangular openings 29, thereby providing access to the interior of the holder basket 28 by the fish within the fishpond 22. When the holder basket 28 is adorned with artificial grasses 24, smaller juvenile fish may find sanctuary from the larger fish by entering the holder basket 28 through the openings 29, and hiding within the grass 24.

The artificial fish habitat 10 is preferably constructed from sturdy plastic material. The dimensions of the individual sections 12 of the fish habitat 10 are approximately eighteen inches in height, thirty-two inches in width, and forty-eight inches in depth. Smaller versions are also provided.

In use, a user attaches the requisite number of sections 12 to each other prior to submersion of the artificial fish habitat 10 within the fishpond 22. The user adorns the holder baskets 28 with artificial grass 24 and extends the lower portions 28L of the holder baskets 28 within the openings 54 within the top panel 12T. The user fills the ballast compartment 55 with rocks or pebbles in order to firmly anchor the artificial fish habitat 10 to the bottom surface 22B of the fishpond 22. The user then submerges the artificial fish habitat 10 within the fishpond 22. The water level within the fishpond 22 is adjusted to partially submerge the grasses 24 within the holder basket 28, in order that juvenile fish may enter the holder basket 28 and thereby find sanctuary within the grasses 24. If aeration of water 52 within the fishpond 22 is desired, the user attaches the first end 32A of the hose 32 to the air outlet valve 31 on the aerator pump 30 prior to activation of the aerator pump 30.

In conclusion, herein is presented an artificial fish habitat for use with a fishpond. The invention is illustrated by example in the drawing figures, and throughout the written description. It should be understood that numerous variations are possible, while adhering to the inventive concept. Such variations are contemplated as being a part of the present invention.

What is claimed is:

1. An artificial fish habitat, for use in conjunction with a fishpond having side walls, a bottom surface, at least one fish, and a quantity of water for the at least one fish to swim in, comprising:

at least one section, having a front panel and a rear panel, wherein the front panel and the rear panel each have an upper portion, a lower portion, a first side and a second side, said at least one section also having a top panel connecting the upper portion of the front panel to the upper portion of the rear panel, wherein the front panel, the rear panel, and the top panel together form a tunnel which may be used by the fish for shelter, wherein said front panel and said rear panel each have a plurality of slotted openings extending fully through said panels for allowing fish to readily enter the tunnel through the front panel and the rear panel; and at least one holder basket selectively attached to the fish habitat in proximity to said top panel, said holder basket having a bottom surface, at least one side surface, and a plurality of openings extending fully through said bottom surface and side surface, said holder basket having artificial grass for providing a sanctuary for juvenile fish which have entered the holder basket through said openings in the holder basket which are provided for this purpose.

2. The artificial fish habitat as recited in claim 1, further comprising an aerator hose attached in proximity to the lower portion of said front panel, said aerator hose having a first end, a second end, an external surface, an internal bore, and a plurality of openings extending fully from the external surface to the internal bore, the first end of said aerator hose being selectively attachable to an externally-located aerator pump, wherein activation of the aerator pump causes pressurized air to enter the hose and to subsequently be released from said openings in the hose, for aeration of the water within the fishpond.

3. The artificial fish habitat as recited in claim 2, wherein the front panel and the rear panel have alternating protruding and recessed columns, wherein the slotted openings include a plurality of parallel and horizontal slotted openings extending through the front panel and the rear panel fully through the alternating protruding and recessed columns, thereby increasing the openings which are available to the fish for entry into the tunnel.

4. The artificial fish habitat as recited in claim 3, wherein the top panel has a holder basket opening extending fully therethrough, said holder basket opening being defined by at least one edge, wherein said opening in the top panel is sized to accommodate said holder basket, and wherein said holder basket additionally has a lip extending laterally outward from the at least one side surface of said holder basket at the upper portion of the holder basket, wherein the lip of the holder basket is supported upon the at least one edge of said holder basket opening in said top panel, after selectively positioning the holder basket within said opening.

5. The artificial fish habitat as recited in claim 4, further comprising a ballast compartment within the top panel for selectively holding substantially weighted materials, for weighing the artificial fish habitat down, so that it rests firmly upon the bottom surface of the fishpond.

6. The artificial fish habitat as recited in claim 5, having a plurality of sections, wherein each section has an attachment device in proximity to one of said sides of said section, for selectively attaching said side of said section to a side of another section, thereby providing an artificial fish habitat of larger overall dimensions.

7. A method of using an artificial fish habitat by a user, in conjunction with a fishpond having side walls, a bottom surface, at least one fish, and a quantity of water for the fish to swim in, said artificial fish habitat having at least one section, having a front panel and a rear panel, wherein the front panel and the rear panel each have an upper portion, a lower portion, a first side and a second side, said at least one section also having a top panel connecting the upper portion of the front panel to the upper portion of the rear panel, wherein the front panel, the rear panel, and the top panel together form a tunnel which may be used by the fish for shelter, wherein said front panel and said rear panel each have a plurality of slotted openings extending fully through said panels, wherein said top panel further has a holder basket opening extending fully therethrough, said fish habitat further having at least one holder basket which is supported within said holder basket opening in said top panel, said holder basket having a bottom surface, at least one side surface, and a plurality of openings extending fully through said bottom surface and side surface, said holder basket having artificial grass, said artificial fish habitat also having a ballast compartment within the top panel, comprising the steps of:

(a) adorning the at least one holder basket by the user with artificial grass;

(b) positioning the at least one holder basket by the user within the holder basket opening within the top panel;

(c) filling the ballast compartment by the user with heavy material so that the artificial fish habitat will be firmly anchored to the bottom surface of the fishpond;

(d) submerging the artificial fish habitat within the fishpond by the user; and (e) adjusting the water level within the fishpond by the user, in order to partially submerge the grasses located within the holder basket, in order that fish may enter the holder basket by swimming into the holder basket through the openings within the holder basket, and find sanctuary within the grasses.

8. The method of using an artificial fish habitat as recited in claim 7, wherein said fish habitat further comprises an aerator hose attached in proximity to the lower portion of the fish habitat, said hose having a first end, a second end, an external surface, an internal bore, and a plurality of openings extending from the external surface to the internal bore, said hose being selectively attachable to an externally located aerator pump having an air outlet valve, wherein the step of adjusting the water level within the fishpond is followed by the step of aerating the water within the fishpond by activating the aerator pump by the user, after selective attachment of the first end of the hose to the air outlet valve of the aerator pump, thereby causing pressurized air produced by said pump to enter said hose and exit through said openings as bubbles, thereby dissolving air within the fishpond.

* * * * *